Patented Feb. 17, 1925.

1,526,529

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS FOR THE PRODUCTION OF HYDROGEN.

No Drawing. Application filed February 23, 1922. Serial No. 538,791.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes for the Production of Hydrogen, of which the following is a specification.

This invention relates to an improved process for the preparation of hydrogen and is an improvement upon the process described in my prior Patent No. 1,425,578.

In the said patent above referred to I have disclosed a process for obtaining pure or substantially pure hydrogen by reacting upon elemental sulfur with steam at temperatures ranging from 500°–1500° C., at which temperatures the sulfur is broken down by the action of the steam to form sulfur dioxid and hydrogen. These gases may be separated by suitable methods to give pure or substantially pure hydrogen which is of such purity as to be capable of being readily employed in processes demanding hydrogen of a high degree of purity such for example as the synthetic production of ammonia.

One object of the present invention is to effect a more complete reaction between the steam and sulfur in the formation of hydrogen and sulfur dioxid and to cause the reaction to occur at a materially lower temperature whereby a considerable saving of labor is accomplished with decreased wear upon the apparatus employed.

Other objects and advantages of the invention relate to certain improved steps and combinations of steps as will be more fully set forth in the detailed description to follow.

As described in my patent above referred to when elemental sulfur is subjected to the action of superheated steam at high temperatures a reaction takes place which results in the formation of sulfur dioxid gas and hydrogen, I have discovered that this reaction may be promoted materially by employing a suitable catalyst such as thorium oxid and the completeness of the reaction facilitated as well as the operation of the same at lower temperatures effectuated and a higher degree of purity in the resulting products obtained.

The reaction may be effected by subjecting mixed vapors of sulfur and steam to a temperature of from 500°–1500° C., in the presence of thorium oxid by passing the sulfur vapor and steam through a suitable refractory tube furnace within which is placed a quantity of thorium oxid so positioned that the mixed vapors will be brought into intimate contact with the thorium oxid during their passage through the furnace. The steam may advantageously be supplied in sufficient excess to insure complete oxidation of the sulfur.

I have found that by making use of thorium oxid as a catalyst the reaction is more complete the reaction being mainly $S+2H_2O=SO_2+2H_2$, that practically no $H_2S$ is present in the exciting gases, and that the reaction can be accomplished at a materially lower temperature than when the catalyst is not employed. The excess steam employed in the reaction may be readily removed from the reaction products by condensation and the gaseous reaction products consisting principally of sulfur dioxid and hydrogen may be separated from each other by well known methods.

While the gases combine at the temperatures indicated above even in the absence of thorium oxid they combine much more rapidly in the presence of the catalyst and produce a greater volume of the sulfur dioxid and hydrogen in a given time and at a given temperature. The speed of the reaction increases with an increase of temperature and the reaction may be effected at a temperature above 1500° C., but I prefer to operate at temperatures below 1500° C. since great care must be exercised in the construction of the apparatus if the exceedingly high temperatures above 1500° C. are to be employed. The presence of thorium oxid greatly increases the amount of sulfur dioxid and hydrogen produced in a given time at a given temperature and thus permits the employment of materially lower temperatures.

Among the various methods which may be advantageously employed for the separation of the sulfur dioxid and hydrogen are the use of suitable absorbents for removing the sulfur dioxid such as the alkali and alkali earth metal hydroxids, the liquefaction of the sulfur dioxid, the absorption of the sulfur dioxid in silica gel, or the absorption of the sulfur dioxid in water. The hydrogen gas remaining after the removal of the sulfur dioxid by any of the methods above enumerated may be subjected to additional purification to remove such traces of oxygen, water vapor, or other contaminants as may be present therein.

If desired the hydrogen obtained as a result of the reaction may be converted into ammonia by being mixed with nitrogen obtained from any desired source in the presence of a hot catalytic agent under suitable conditions of temperature and pressure, and the ammonia thus formed employed as an agent for separating the sulfur dioxid and hydrogen obtained as a result of the continued operation of the above process in which case the sulfur dioxid formed combines with the ammonia to form ammonium sulfite which may be oxidized to ammonium sulfate in any known or approved manner and the hydrogen freed may be mixed with a further supply of nitrogen and synthesized to ammonia thus effecting a continuous process. The sulfur obtained by modern extraction methods is substantially free from impurities adapted to produce undesirable contaminants in the reaction products and the steam being also free from impurities results in the production of hydrogen in a high state of purity and which will in consequence not require expensive and prolonged purification in order to prepare it for use in the synthesis of ammonia.

What I claim is:—

1. The process of preparing substantially pure hydrogen which comprises reacting with steam upon elemental sulfur at a high temperature and in the presence of thorium oxid.

2. The process of preparing substantially pure hydrogen, which comprises reacting with steam upon elemental sulfur in the presence of thorium oxid, and separating the sulfur dioxid thus formed from the gaseous reaction products.

3. The process of preparing substantially pure hydrogen, which comprises, reacting with steam upon elemental sulfur in the presence of a catalyst and at a temperature of from 500°–1500° C.

4. The process of preparing substantially pure hydrogen, which comprises, reacting with steam upon elemental sulfur in the presence of a catalyst and at a temperature of from 500°–1500° C., and removing the sulfur dioxid thus formed from the gaseous reaction products.

5. The process of preparing substantially pure hydrogen, comprising reacting with steam upon sulfur at a high temperature and in the presence of a catalyst, absorbing the sulfur dioxid from the gaseous reaction product by means of ammonia, combining the purified hydrogen with nitrogen to form ammonia, and absorbing sulfur dioxid from a further quantity of said gaseous reaction products by means of the formed ammonia.

6. The process of preparing substantially pure hydrogen, comprising reacting with superheated steam upon elemental sulfur at an elevated temperature in the presence of a catalyst, and removing sulfur dioxid from the gaseous reaction products by passing said product into contact with ammonia.

In testimony whereof I have affixed my signature.

JOHN COLLINS CLANCY.